United States Patent
Smith et al.

(10) Patent No.: US 7,769,532 B2
(45) Date of Patent: Aug. 3, 2010

(54) METHOD FOR OPERATING FUEL INJECTION SYSTEM

(75) Inventors: Michael David Smith, Huntingdon (GB); Stephen William Bird, Peterborough (GB)

(73) Assignee: Perkins Engines Company Limited, Peterborough (GB)

( * ) Notice: Subject to any disclaimer, the term of this patent is extended or adjusted under 35 U.S.C. 154(b) by 23 days.

(21) Appl. No.: 12/078,429

(22) Filed: Mar. 31, 2008

(65) Prior Publication Data

US 2009/0248272 A1      Oct. 1, 2009

(51) Int. Cl.
*B60T 7/12* (2006.01)
*G05D 1/00* (2006.01)
*G06F 7/00* (2006.01)
*G06F 17/00* (2006.01)

(52) U.S. Cl. .............. 701/106; 701/110; 701/115; 123/299; 123/486

(58) Field of Classification Search .......... 123/299, 123/300, 305, 435, 436, 478, 480, 486; 701/101, 701/102, 103, 104, 105, 110, 106, 115
See application file for complete search history.

(56) References Cited

U.S. PATENT DOCUMENTS

| | | | |
|---|---|---|---|
| 5,771,861 A | 6/1998 | Musser et al. | |
| 5,865,158 A | 2/1999 | Cleveland et al. | |
| 5,901,682 A | 5/1999 | McGee et al. | |
| 6,026,780 A | 2/2000 | Barnes et al. | |
| 6,082,331 A | 7/2000 | Barnes et al. | |
| 6,363,315 B1 | 3/2002 | Love et al. | |
| 6,371,077 B1 | 4/2002 | McGee | |
| 6,415,762 B1 | 7/2002 | Hafner et al. | |
| 6,450,149 B1 | 9/2002 | McGee | |
| 6,636,797 B2 | 10/2003 | Yoshizawa et al. | |
| 6,705,278 B2 | 3/2004 | McGee et al. | |
| 6,843,221 B2 | 1/2005 | McGee et al. | |
| 6,863,056 B2 | 3/2005 | Hafner et al. | |
| 6,961,651 B2* | 11/2005 | Oshima ................. | 701/104 |
| 6,966,040 B2 | 11/2005 | Ismailov | |

(Continued)

OTHER PUBLICATIONS

U.S. Appl. No. 12/078,408, titled "Shot Mode Transition Method for Fuel Injection System," filed Mar. 31, 2008 with Applicant Michael David Smith (21 pages).

(Continued)

*Primary Examiner*—Hai H Huynh
*Assistant Examiner*—Anthony L Bacon
(74) *Attorney, Agent, or Firm*—Finnegan, Henderson, Farabow, Garrett & Dunner, LLC

(57) ABSTRACT

A machine is disclosed. The machine may have an engine having a combustion chamber. The machine may also have a first sensor configured to generate a first signal indicative of a speed of the combustion engine. Additionally, the machine may have a second sensor configured to generate a second signal indicative of a desired supplied fuel quantity. The machine may also have a counter configured to generate a third signal indicative of a count. Additionally, the machine may have a fuel injection system having a controller. The controller may be configured to, based on the first, second, and third signals, select one of a plurality of shot modes and generate a corresponding fourth signal. The fuel injection system may also have a fuel injector configured to, based on the fourth signal, inject a quantity of fuel into the combustion chamber.

14 Claims, 3 Drawing Sheets

U.S. PATENT DOCUMENTS

| | | | |
|---|---|---|---|
| 7,051,699 B2 * | 5/2006 | McGee et al. | 123/295 |
| 7,296,555 B2 | 11/2007 | Tamma et al. | |
| 2002/0195081 A1 | 12/2002 | McGee et al. | |
| 2004/0200458 A1 * | 10/2004 | Lewis et al. | 123/491 |
| 2007/0295307 A1 * | 12/2007 | Kerns | 123/445 |
| 2008/0201060 A1 * | 8/2008 | Nagai | 701/103 |

OTHER PUBLICATIONS

Office Action of U.S. Appl. No. 12/078,408 mailed on Jun. 19, 2009 (6 pages).

* cited by examiner

METHOD FOR OPERATING FUEL INJECTION SYSTEM

TECHNICAL FIELD

The present disclosure relates generally to a fuel injection system and, more particularly, to a method of operating the fuel injection system.

BACKGROUND

Electronically controlled direct fuel injection devices are well known in the art. Such devices include electronically controlled fuel injectors, which may be hydraulically or mechanically actuated. During an injection event, an electronically controlled fuel injector injects fuel into a combustion chamber in response to an electronic fuel injection signal produced by a controller. This signal includes a waveform indicative of an injection rate. The fuel injection waveform is tailored based on engine operating conditions. Specifically, the fuel injection waveform is tailored to include multiple fuel injections (hereafter "shots") during each injection event. This use of multiple shots during each injection event may enable compliance with exhaust emissions regulations. These regulations restrict, for example, the emission of hydrocarbons and carbon monoxide, the release of particulates, and the release of nitrogen oxides (NOx). Each shot has specific attributes such as, for example, a duration and an injection rate. Shots are grouped, ordered, and timed to form shot modes, which correspond to fuel injection waveforms. Based on an engine speed and a desired quantity of fuel supplied to the engine, a shot mode is selected for each injection event. At different engine operating conditions, different shot modes are selected to achieve desired engine performances while complying with emissions regulations.

During normal operation of the engine, the selected shot mode may change several times. Typically, shot modes differ slightly in both noise level and torque produced. In some instances, transitioning from one shot mode to another causes a noticeable "step-change" in either or both of these characteristics and/or other characteristics. This sudden change in characteristics is undesirable.

One way to minimize the sudden change in characteristics is described in U.S. Pat. No. 6,371,077 (the '077 patent) issued to McGee on Apr. 16, 2002. The '077 patent describes a method for controlling a fuel injection control system to transition from one waveform to another. The method includes setting single check fuel hysteresis values, loop fuel hysteresis values, and engine speed hysteresis values. A potential waveform is determined from a lookup table or map, and a single check fuel change, an engine speed change, and a loop fuel value change are determined by comparing current fuel and engine speed values with previous fuel and engine speed values. If both the single check fuel change and engine speed change are greater than the respective hysteresis values in a single check, the active waveform is changed to the potential waveform. Additionally or alternatively, if the loop fuel value change is greater than the loop fuel hysteresis values for a repeated number of comparisons, the active waveform is changed to the potential waveform.

Although the method of the '077 patent may provide for a smooth transitioning from use of one waveform type to another waveform type by preventing repeated transfer back and forth between the waveforms, the method of the '077 patent may do little to allow for continuous transitioning of a fuel injection system between two shot modes. Failing to continuously transition the fuel injection system between two shot modes may decrease an efficiency of a combustion engine. For example, the combustion engine may operate on average at a higher or lower speed and/or fuel consumption than is desired.

The disclosed method and system are directed to improving prior systems.

SUMMARY

In one aspect, the present disclosure may be directed to a method of operating a fuel injection system. The method may include receiving a first signal indicative of a count. Additionally, the method may include receiving a second signal indicative of a speed of a combustion engine. The method may also include receiving a third signal indicative of a desired supplied fuel quantity. In addition, the method may include operating a fuel injector of the fuel injection system in one of a plurality of shot modes based on the first signal, the second signal, and the third signal.

In another aspect, the present disclosure may be directed to a machine. The machine may include a combustion engine, which may in turn include a combustion chamber. Additionally, the machine may include a first sensor configured to sense a parameter indicative of a speed of the combustion engine and generate a corresponding first signal. The machine may also include a second sensor configured to sense a parameter indicative of a desired supplied fuel quantity and generate a corresponding second signal. In addition, the machine may include a counter configured to determine a parameter indicative of a count and generate a corresponding third signal. The machine may also include a fuel injection system. The fuel injection system may include a controller in communication with the first sensor, the second sensor, and the counter. The controller may be configured to, based on the first, second, and third signals, select one of a plurality of shot modes and generate a corresponding fourth signal. The fuel injection system may also include a fuel injector in communication with the controller. The fuel injector may be configured to, based on the fourth signal, inject a quantity of fuel into the combustion chamber.

In yet another aspect, the present disclosure may be directed to a method of operating a fuel injection system. The method may include receiving a first signal indicative of a first count. Additionally, the method may include receiving a second signal indicative of a first speed of a combustion engine. The method may also include receiving a third signal indicative of a first desired supplied fuel quantity. In addition, the method may include selecting a first one of a plurality of shot modes based on the first signal, the second signal, and the third signal. The method may also include injecting with a first fuel injector of the fuel injection system a first quantity of fuel, based on the selected first one of the plurality of shot modes. The method may additionally include receiving a fourth signal indicative of a second count. The method may also include receiving a fifth signal indicative of a second speed of the combustion engine. In addition, the method may include receiving a sixth signal indicative of a second desired supplied fuel quantity. The method may also include selecting a second one of the plurality of shot modes based on the fourth signal, the fifth signal, and the sixth signal. Additionally, the method may include injecting with a second fuel injector of the fuel injection system a second quantity of fuel, based on the selected second one of the plurality of shot modes.

DETAILED DESCRIPTION

Figure 1:
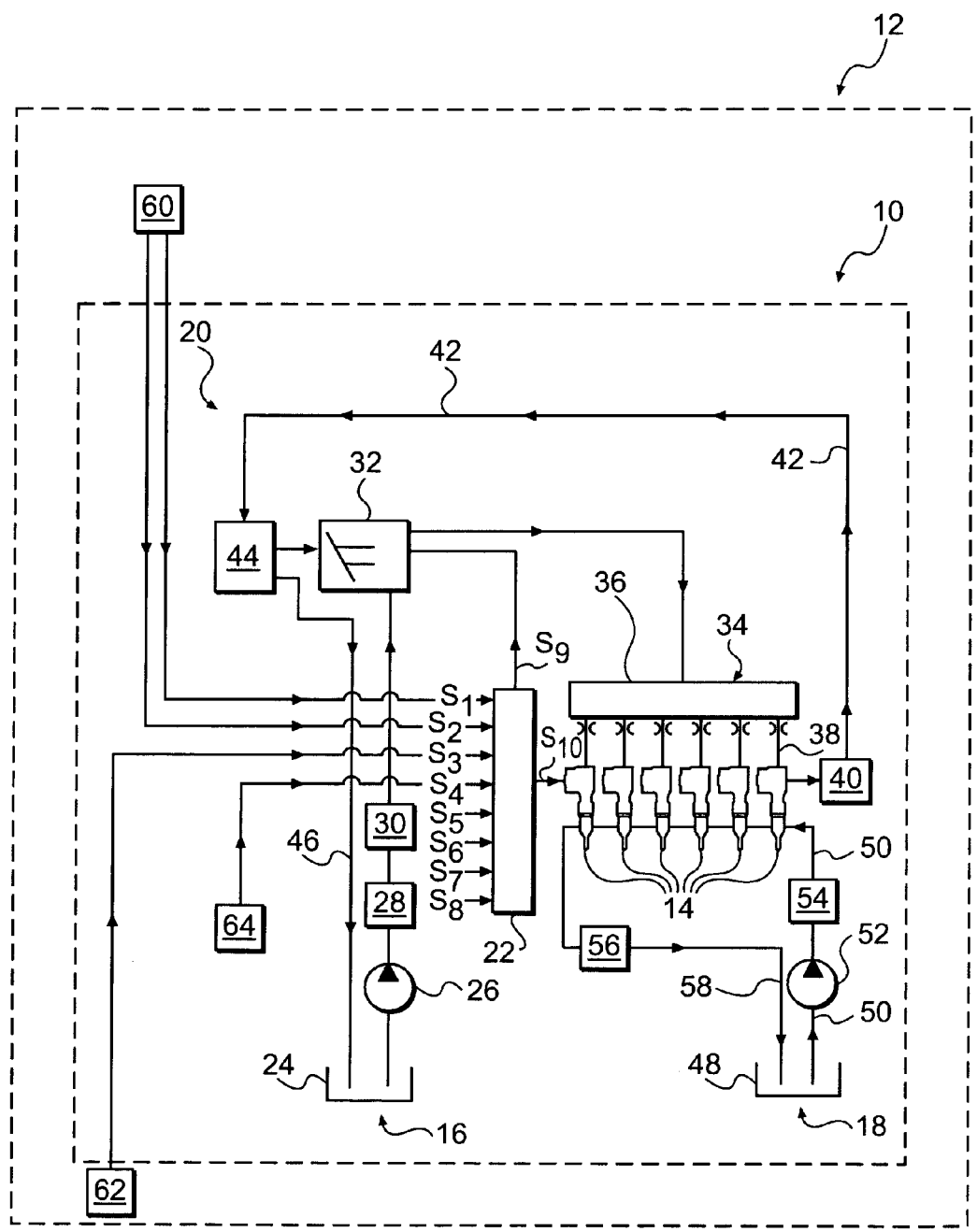
FIG. 1 is a diagrammatic illustration of an exemplary disclosed fuel injection system.

FIG. 1 illustrates a hydraulically actuated electronically controlled fuel injection system 10 (hereafter "fuel injection system 10") for a combustion engine 12. Combustion engine 12 may be utilized by various types of machines such as, for example, fixed or mobile machines that perform some type of operation associated with an industry such as mining, construction, farming, transportation, power generation, tree harvesting, forestry, or another industry known in the art. Combustion engine 12 may be an internal combustion engine, such as, for example, a diesel engine or a gasoline engine. While FIG. 1 illustrates combustion engine 12 as an in-line six cylinder engine, it is contemplated that combustion engine 12 may be a V-type engine or a rotary engine. Additionally, it is contemplated that combustion engine 12 may contain any number of cylinders or combustion chambers (not shown).

Fuel injection system 10 may include one or more electronically controlled fuel injection devices. For example, fuel injection system 10 may include one or more fuel injectors 14, which may each be situated to inject fuel into a combustion chamber of combustion engine 12. While FIG. 1 illustrates fuel injectors 14 as hydraulically actuated, it is contemplated that fuel injectors 14 may be mechanically or electronically actuated.

Fuel injection system 10 may also include an actuation fluid supply apparatus 16 for supplying an actuation fluid to each fuel injector 14. In addition, fuel injection system 10 may include a fuel supply apparatus 18 for supplying a quantity of fuel to each fuel injector 14. Fuel injection system 10 may also include an actuation fluid recirculation system 20 for recirculating the actuation fluid and/or recovering hydraulic energy from the actuation fluid leaving each fuel injector 14. Additionally, fuel injection system 10 may include a controller 22 for controlling the operation of fuel injection system 10. For example, controller 22 may control how fuel is injected by fuel injectors 14. Specifically, controller 22 may determine a shot mode for use during an injection event. The shot mode may include a group of shots, which are ordered and timed to achieve a desired engine performance while complying with emissions regulations. It is contemplated that the group of shots may comprise one or more shots. Each shot may have specific attributes such as, for example, a duration and an injection rate. The attributes of the shot(s) included in a group may dictate a specific set of fuel delivery characteristics for the shot mode. These fuel delivery characteristics may include, for example, a noise level and a torque production level. The injection event may include all of the shots that occur in a particular cylinder or combustion chamber during one cycle of combustion engine 12.

Actuation fluid supply apparatus 16 may include an actuation fluid reservoir 24, a low pressure actuation fluid pump 26, an actuation fluid cooler 28, an actuation fluid filter 30, a high pressure actuation fluid pump 32, and an actuation fluid rail 34. Actuation fluid rail 34 may include a common rail passage 36, which may be arranged in fluid communication with an outlet from high pressure actuation fluid pump 32. Actuation fluid rail 34 may also include one or more rail branch passages 38, each of which may connect an actuation fluid inlet of one fuel injector 14 to common rail passage 36. If fuel injector 14 is mechanically actuated, actuation fluid rail 34 may be replaced with a cam actuating arrangement or other mechanical means of actuation.

Actuation fluid recirculation system 20 may include one or more waste accumulating fluid control valves 40, each of which may be connected to an actuation fluid drain of one fuel injector 14 (only shown by way of example). The actuation fluid leaving the one or more waste accumulating control valves 40 may enter recirculation line 42, which may be connected to a hydraulic motor 44. Hydraulic motor 44 may channel a first portion of the actuation fluid to high pressure actuation fluid pump 32. And, hydraulic motor 44 may return a second portion of the actuation fluid to actuation fluid reservoir 24 via recirculation line 46.

It is contemplated that fuel injection system 10 may be connected as a parasitic subsystem to a lubricating oil circulation system of combustion engine 12. In such a case, the actuation fluid may be engine lubricating oil and actuation fluid reservoir 24 may be an engine lubrication oil sump. Alternatively, fuel injection system 10 may not be a parasitic subsystem, and the actuation fluid may be a fuel or another suitable liquid.

Fuel supply apparatus 18 may include a fuel tank 48. Fuel supply apparatus 18 may also include a fuel supply passage 50, which may be arranged in fluid communication between fuel tank 48 and a fuel inlet of each fuel injector 14. Additionally, fuel supply apparatus 18 may include a low pressure fuel pump 52, a fuel filter 54, and a fuel supply regulating valve 56. Fuel supply apparatus 18 may also include a fuel circulation and return passage 58, which may be arranged in fluid communication between each fuel injector 14 and fuel tank 48.

Controller 22 may embody, for example, an engine control module, and may include means for monitoring, recording, storing, indexing, processing, and/or communicating information. These means may include, for example, a counter, a memory, one or more data storage devices, a central processing unit, and/or another component that may be used to run the disclosed applications. Furthermore, although aspects of the present disclosure may be described generally as being stored in memory, one skilled in the art will appreciate that these aspects can be stored on or read from different types of computer program products or computer-readable media such as computer chips and secondary storage devices, including hard disks, floppy disks, optical media, CD-ROM, or other forms of RAM or ROM. The memory may store, for example, instruction sets, maps, lookup tables, and variables.

Controller 22 may receive a plurality of sensor input signals such as, for example, $S_1$ thru $S_8$, which correspond to sensor inputs. These sensor inputs may be indicative of operating conditions of combustion engine 12 such as, for example, a speed of combustion engine 12, a temperature of combustion engine 12, an actuation fluid pressure of combustion engine 12, or a piston position of combustion engine 12; a desired supplied fuel quantity to each fuel injector 14 (hereafter "desired supplied fuel quantity"); fuel delivery characteristics of a shot mode; and/or other inputs, which controller 22 may use to determine the shot mode for use during the injection event.

For example, a signal designated by $S_1$ in FIG. 1 may be indicative of the desired supplied fuel quantity and may be communicated by a throttle sensor 60. The desired supplied fuel quantity may be related to a sensed actuation position of a manually operated throttle device (not shown). Alternatively, signal $S_1$ may be internal to controller 22 and the desired supplied fuel quantity may be determined by a closed loop calculation or other automatic calculation. This closed loop calculation or other automatic calculation may be related to a signal designated by $S_2$ in FIG. 1. Signal $S_2$ may be indicative of a desired speed or other operational parameter of combustion engine 12 and may be communicated by throttle sensor 60. The desired speed or other operational parameter of combustion engine 12 may be related to the sensed actuation position of the manually operated throttle device. In yet another alternative, the closed loop calculation or other automatic calculation may be unrelated to signal $S_2$ and may be performed during operation of an autonomous vehicle. As another example, a signal designated by $S_3$ in FIG. 1 may be indicative of the speed of combustion engine 12 and may be communicated by an engine speed sensor 62. As yet another example, a signal designated by $S_4$ in FIG. 1 may be indicative of a count and may be communicated by a counter 64. The count may be related to a number of injection events having taken place. In particular, counter 64 may increment the count either before, after, or during each injection event. Alternatively, the count may be related to a passage of time. It is contemplated that counter 64 may be internal or external to controller 22. Therefore, signal $S_4$ may also be internal or external to controller 22.

It is contemplated that based on the above discussed signals and a desired shot mode map stored in the memory of controller 22 (referring to FIG. 2), controller 22 may select the shot mode for use during the injection event. Based on this selected shot mode, controller 22 may generate control signal $S_9$ and fuel injection signal $S_{10}$. Signal $S_9$ may control the actuation fluid pressure from high pressure actuation fluid pump 32. And, signal $S_{10}$ may control the injection of fuel by fuel injector 14. Specifically, signal $S_{10}$ may include a waveform indicative of an injection rate of fuel by fuel injector 14.

While FIG. 1 illustrates fuel injection system 10 as being hydraulically actuated and electronically controlled, it is contemplated that the systems and methods disclosed herein may be equally applicable to a common rail fuel injection system (not shown). The common rail fuel injection system may differ from fuel injection system 10 in that it may not include both of actuation fluid supply apparatus 16 and actuation fluid recirculation system 20. Instead, the common rail fuel injection system may include a common rail, which may connect fuel supply passage 50 to the fuel inlet of each fuel injector 14. Fuel within the common rail may be pressurized by a high pressure pump. A flow of this pressurized fuel into the fuel inlet of each fuel injector 14 may be controlled by a valve within each respective fuel injector 14. The opening of these valves may be controlled by signal $S_{10}$ and may in turn control the injection of fuel by fuel injectors 14. If the pressure within the common rail exceeds a certain threshold, a fuel supply regulating valve fluidly coupled to the common rail may be opened to allow fuel from the common rail to flow to fuel tank 48 by way of a return passage.

Figure 2:
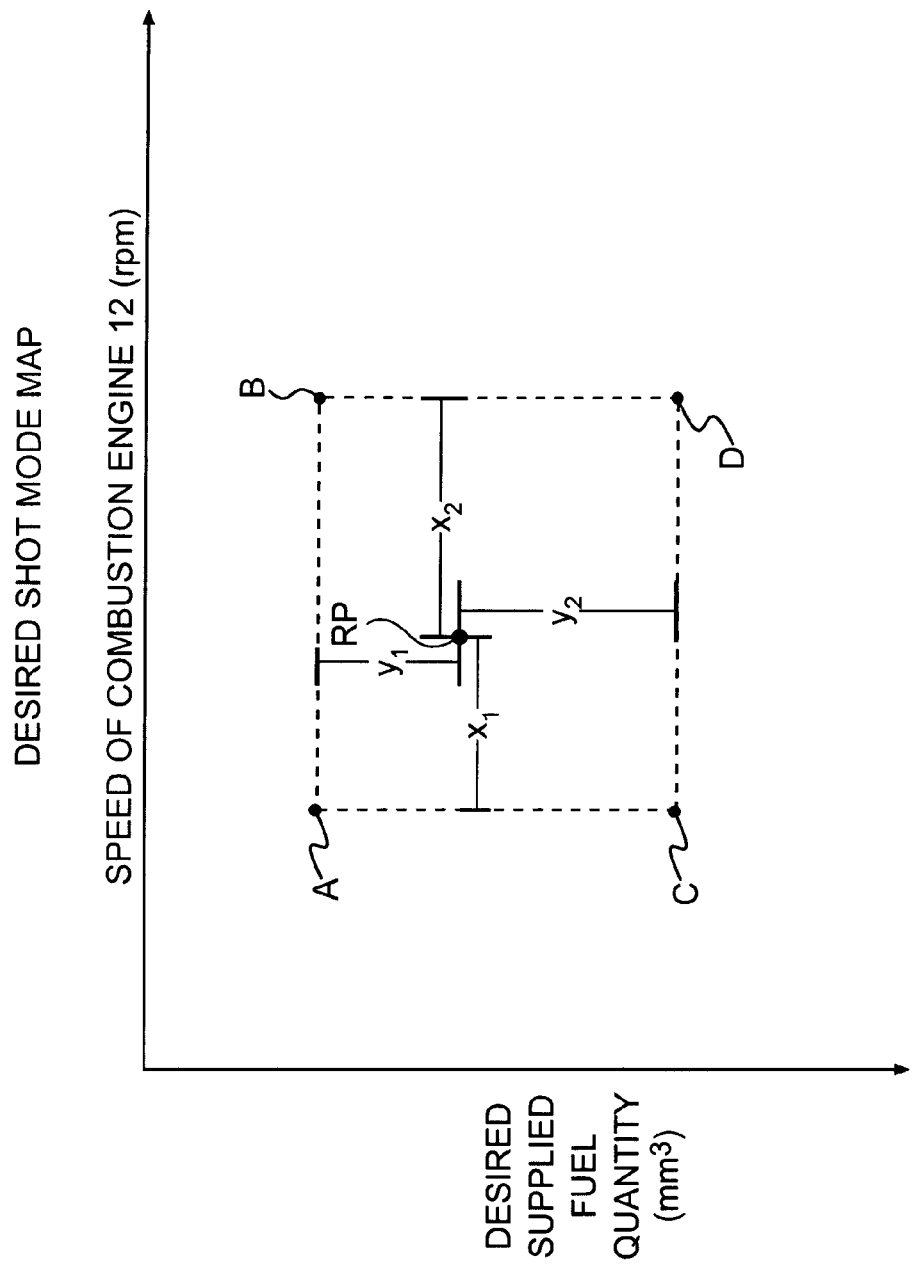
FIG. 2 is a graph illustrating an exemplary disclosed desired shot mode map of the fuel injection system of FIG. 1.

As illustrated in FIG. 2, the desired shot mode map may include points RP, A, B, C, and D, each of which may have locations defined with respect to a desired supplied fuel quantity axis (hereafter "axis y") and a speed of combustion engine 12 axis (hereafter "axis x"). These locations may be expressed in the form Z=(Zx, Zy), where Z represents the name of a point (e.g., RP), Zx represents the location of the point with respect to axis x, and Zy represents the location of the point with respect to axis y. For example, the location of point RP may be expressed as (RPx, RPy). RPy may equal the received desired supplied fuel quantity and RPx may equal the received speed of combustion engine 12.

It is contemplated that each of points A, B, C, and D may represent the optimum desired supplied fuel quantity and the optimum speed of combustion engine 12 for a shot mode A, a shot mode B, a shot mode C, and a shot mode D, respectively. Although each of shot modes A, B, C, and D may have different fuel delivery characteristics, it is contemplated that Ax may equal Cx, Bx may equal Dx, Ay may equal By, and Cy may equal Dy. Additionally, Ax may be less than RPx, Ay may be less than RPy, Dx may be greater than RPx, and Dy may be greater than RPy.

It is also contemplated that shot modes A, B, C, and D may be made applicable to combustion engines 12 using only two shot modes. For example, combustion engine 12 may use a shot mode α and a shot mode β, each of which has a set of optimum desired supplied fuel quantities and optimum speeds of combustion engine 12 (hereafter "the set") forming a line connecting two of points A, B, C, and D. Rather than being associated with one of points A, B, C, and D, each of shot modes α and β may be defined to include two of shot modes A, B, C, and D. Therefore, shot modes α and β are hereafter referred to as "combined shot modes." The two of shot modes A, B, C, and D are hereafter referred to as "equivalent shot modes" because both may have the same fuel delivery characteristics when included by one combined shot mode. For example, combined shot mode α may include equivalent shot modes A and B. Equivalent shot modes A and B may define the set for combined shot mode a to include points on the line connecting points A and B. Alternatively, combined shot mode a may include equivalent shot modes A and C. Equivalent shot modes A and C may define the set for combined shot mode α to include points on the line connecting points A and C. As another example, combined shot mode β may include equivalent shot modes C and D. Equivalent shot modes C and D may together define the set for combined shot mode β to include points on the line connecting points C and D. Alternatively, combined shot mode β may include equivalent shot modes B and D. Equivalent shot modes B and D may together define the set for combined shot mode β to include points on the line connecting points B and D.

It is further contemplated that the desired shot mode map may include fewer or more than four points, each of which represent the optimum desired supplied fuel quantity and the optimum speed of combustion engine 12 for one shot mode. For example, the desired shot mode map may include points A, B, and C, but not point D. Points A, B, and C may be associated with shot modes A, B, and C, respectively.

As illustrated in FIG. 2, magnitudes of $y_1$, $y_2$, $x_1$, and $x_2$ may be defined as follows:

$$y_1=RPy-Ay,\ y_2=Cy-RPy,\ x_1=RPx-Ax,\ \text{and}\ x_2=Bx-RPx.$$

Figure 3:
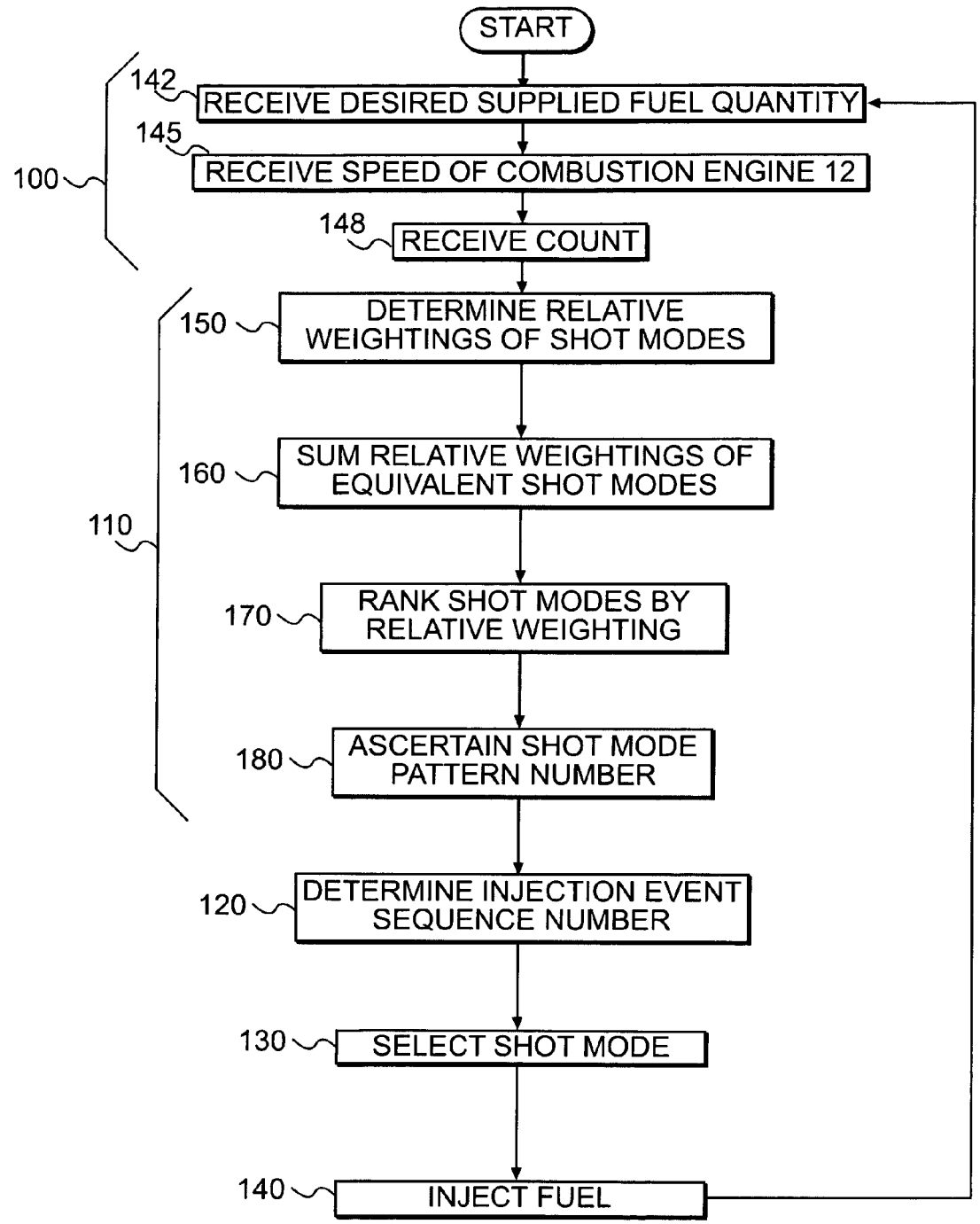
FIG. 3 is a flow chart describing an exemplary method of operating the fuel injection system of FIG. 1.

FIG. 3 illustrates an exemplary method of operating fuel injection system 10. FIG. 3 will be discussed in the following section to further illustrate fuel injection system 10 and its operation.

INDUSTRIAL APPLICABILITY

The disclosed fuel injection system may be applicable to combustion engines, which may operate in one of a plurality of shot modes. In particular, the system may receive for each injection event a desired supplied fuel quantity, a speed of a combustion engine, and a count. Based on these receptions, the system may inject during each injection event a fuel quantity in accordance with one of the plurality of shot modes. Operation of the system will now be described.

As illustrated in FIG. 3, operation of fuel injection system 10 may commence at a step 100, which may include initialization of controller 22. Based on this initialization, controller 22 may determine a shot mode pattern number (step 110).

Before or after step 110, controller 22 may also determine an injection event sequence number based on the initialization (step 120). Controller 22 may then select one of the plurality of shot modes (step 130). Controller 22 may then operate fuel injector 14 to inject a quantity of fuel into a cylinder or combustion chamber of combustion engine 12 in accordance with the selected one of the plurality of shot modes (step 140). After step 140, controller 22 may repeat steps 100 thru 140. During the repetition, controller 22 may again operate the same fuel injector 14 or instead operate another fuel injector 14.

The initialization of step 100 may involve populating the memory of controller 22. It is contemplated that this initialization may occur before or during each injection event. It is also contemplated that the initialization of step 100 may include sub-steps. For example, controller 22 may receive internally or from throttle sensor 60 signal $S_1$, which may be indicative of the desired supplied fuel quantity (sub-step 142). Controller 22 may store in its memory for later use this desired supplied fuel quantity. Concurrent with, before, or after sub-step 142, controller 22 may also receive from engine speed sensor 62 signal $S_3$, which may be indicative of the speed of combustion engine 12 (sub-step 145). Controller 22 may store in its memory for later use this speed of combustion engine 12. Concurrent with, before, or after sub-step 145, controller 22 may additionally receive from counter 64 signal $S_4$, which may be indicative of the count (sub-step 148). Controller 22 may store in its memory for later use this count.

The determining of the shot mode pattern number (step 110) may also include sub-steps. For example, controller 22 may determine relative weightings of each of the shot modes (sub-step 150). If combustion engine 12 has combined shot modes, controller 22 may then sum the relative weightings of the equivalent shot modes included by each of the combined shot modes (sub-step 160). Regardless of whether combustion engine 12 has combined shot modes, controller 22 may then rank the shot modes with respect to the relative weighting of each shot mode (sub-step 170). Next, controller 22 may ascertain the shot mode pattern number (sub-step 180).

The determining of the relative weightings of each of the shot modes (sub-step 150) may include accessing the desired shot mode map (referring to FIG. 2). In particular, controller 22 may interpolate a relative weighting of each of the shot modes. This interpolation may be based on the location of point RP, which includes the desired supplied fuel quantity and the speed of combustion engine 12. Specifically, the interpolation may be based on the magnitudes of $y_1$, $y_2$, $x_1$, and $x_2$. As defined above, $y_1$, $y_2$, $x_1$, and $x_2$ may in turn be based on the location of point RP. The relative weighting may represent the frequency of injection events of one shot mode as related to the frequency of injection events of all of the other shot modes. For example, if the relative weighting of shot mode A is 0.9, controller 22 may operate fuel injector 14 in shot mode A for nine out of every 10 injection events. Specifically, the interpolation may include the following formulas:

$$w_a = \frac{1}{4}\left(\frac{y_2}{y_1 + y_2} + \frac{x_2}{x_1 + x_2}\right),$$

where $w_a$ represents the relative weighting of shot mode A;

$$w_b = \frac{1}{4}\left(\frac{y_2}{y_1 + y_2} + \frac{x_1}{x_1 + x_2}\right),$$

where $w_b$ represents the relative weighting of shot mode B;

-continued $$w_c = \frac{1}{4}\left(\frac{y_1}{y_1 + y_2} + \frac{x_2}{x_1 + x_2}\right),$$

where $w_c$ represents the relative weighting of shot mode C; and $$w_d = \frac{1}{4}\left(\frac{y_1}{y_1 + y_2} + \frac{x_1}{x_1 + x_2}\right),$$

where $w_d$ represents the relative weighting of shot mode D.

For example, if $y_1=210$, $y_2=755$, $x_1=200$, and $x_2=4750$, then $$w_a = \frac{1}{4}\left(\frac{755}{210 + 755} + \frac{4750}{200 + 4750}\right) \approx 0.435495,$$

$$w_b = \frac{1}{4}\left(\frac{755}{210 + 755} + \frac{200}{200 + 4750}\right) \approx 0.205697,$$

$$w_c = \frac{1}{4}\left(\frac{210}{210 + 755} + \frac{4750}{200 + 4750}\right) \approx 0.294303, \text{ and}$$

$$w_d = \frac{1}{4}\left(\frac{210}{210 + 755} + \frac{200}{200 + 4750}\right) \approx 0.064505.$$

It is contemplated that the relative weightings may be rounded to one decimal place. This rounding may include bankers' rounding, or another type of rounding that may result in the sum of the relative weights being one. Bankers' rounding includes increasing the tenth's place digit by one if the hundredth's place digit is 6 or more, or is a 5 followed by one or more non-zero digits. Additionally, bankers' rounding includes leaving the tenth's place digit the same if the hundredth's place digit is 4 or less. Otherwise, bankers' rounding includes rounding the tenth's place digit to the nearest even digit (i.e. even tenth's place digits are left the same and odd tenth's place digits are increased by one). For example, $w_a$ may be rounded to 0.4, $w_b$ may be rounded to 0.2, $w_c$ may be rounded to 0.3, and $w_d$ may be rounded to 0.1. If combustion engine 12 has combined shot modes, controller 22 may before or after the rounding proceed to sub-step 160 and sum the relative weightings of the equivalent shot modes included by each of the combined shot modes. Otherwise, controller 22 may proceed to sub-step 170.

The summing of sub-step 160 may include calculating the sums of the relative weightings (rounded or not) of the equivalent shot modes included by each of the combined shot modes. For example, if combined shot mode α includes equivalent shot modes A and B, and the relative weighting of shot mode A is 0.3 and the relative weighting of shot mode B is 0.3, the calculated sum may be 0.6. The summing of sub-step 160 may also include storing the calculated sums of the relative weightings of the equivalent shot modes included by each of the combined shot modes. These sums may be stored as the relative weightings of one of the equivalent shot modes of each of the combined shot modes. And, zero may be stored as the other relative weightings of the equivalent shot modes included by each of the combined shot modes. For example, if combined shot mode a includes equivalent shot modes A and B, and the calculated sum is 0.6, 0.6 may be stored as the relative weighting of shot mode A and zero may be stored as the relative weighting of shot mode B. Alternatively, 0.6 may be stored as the relative weighting of shot mode B and zero may be stored as the relative weighting of shot mode A. In addition, the summing of sub-step 160 may include rounding the calculated sum to one decimal place. This rounding may be equivalent to the rounding of sub-step 150. Controller 22 may then proceed to sub-step 170.

As previously discussed, the ranking of sub-step 170 may be without regard to whether combustion engine 12 has combined shot modes. This is because the ranking of sub-step 170 may be based directly on the rounded relative weightings of the shot modes as stored in the memory of controller 22. The ranking of sub-step 170 may include ordering the shot modes by their rounded relative weightings from largest to smallest. For example, if $w_a$ is 0.4, $w_b$ is 0.2, $w_c$ is 0.3, and $w_d$ is 0.1, the order of the shot modes may be shot mode A, shot mode C, shot mode B, shot mode D. The ranking of sub-step 170 may also include assigning ranks to these ordered shot modes. For example, the shot modes may be assigned roman numeral ranks: shot mode A (the largest) may be assigned rank i, shot mode C (the second largest) may be assigned rank ii, shot mode B (the third largest) may be assigned rank iii, and shot mode D (the fourth largest) may be assigned rank iv. Controller 22 may then proceed to sub-step 180.

The ascertaining of sub-step 180 may include accessing a lookup table such as, for example, Table 1, which may be stored in the memory of controller 22. Table 1 may be in the form of a table, graph, equation, or other memory structure capable of storing relational information. For example, Table 1 may relate the shot mode pattern number to the ranked shot modes. It is contemplated that this relation may vary depending on the makeup and use of combustion engine 12. For example, Table 1 may include shot mode pattern numbers for each possible combination of the ranked shot modes.

TABLE 1

| Shot Mode Pattern Number | Rank | | | |
|---|---|---|---|---|
| | i | ii | iii | iv |
| 1 | 1 | 0 | 0 | 0 |
| 2 | 0.9 | 0.1 | 0 | 0 |
| 3 | 0.8 | 0.2 | 0 | 0 |
| 4 | 0.8 | 0.1 | 0.1 | 0 |
| 5 | 0.7 | 0.3 | 0 | 0 |
| 6 | 0.7 | 0.2 | 0.1 | 0 |
| 7 | 0.7 | 0.1 | 0.1 | 0.1 |
| 8 | 0.6 | 0.4 | 0 | 0 |
| 9 | 0.6 | 0.3 | 0.1 | 0 |
| 10 | 0.6 | 0.2 | 0.2 | 0 |
| 11 | 0.6 | 0.2 | 0.1 | 0.1 |
| 12 | 0.5 | 0.5 | 0 | 0 |
| 13 | 0.5 | 0.4 | 0.1 | 0 |
| 14 | 0.5 | 0.3 | 0.2 | 0 |
| 15 | 0.5 | 0.3 | 0.1 | 0.1 |
| 16 | 0.5 | 0.2 | 0.2 | 0.1 |
| 17 | 0.4 | 0.4 | 0.2 | 0 |
| 18 | 0.4 | 0.4 | 0.1 | 0.1 |
| 19 | 0.4 | 0.3 | 0.3 | 0 |
| 20 | 0.4 | 0.3 | 0.2 | 0.1 |
| 21 | 0.3 | 0.3 | 0.3 | 0.1 |
| 22 | 0.3 | 0.3 | 0.2 | 0.2 |

Controller 22 may lookup and store for later use the shot mode pattern number, based on the ranked shot modes. For example, if the ranked shot modes include rank i with rounded relative weighting 0.4, rank ii with rounded relative weighting 0.3, rank iii with rounded relative weighting 0.2, and rank iv with rounded relative weighting 0.1, the shot mode pattern number may be 20.

The determining of the injection event sequence number (step 120) may include a modulo operation. In particular controller 22 may determine the injection event sequence number by performing a modulo operation, which may include the count. As previously discussed, the count may be related to a number of injection events having taken place. In particular, the count may be incremented either before, after, or during each injection event. Alternatively, the determined count may be related to a passage of time (i.e. an incrementing of time). For example, controller 22 may determine the injection event sequence number using the formula $\#=c \bmod(d)+1$, where # is the injection event sequence number, c is the count, mod is the modulo operator, and d is the divisor. It is contemplated that the divisor may be any number other than 0. For example, the divisor may be 10. If the divisor is 10, the formula will yield injection event sequence numbers 1 thru 10. In particular, if the count is related to a number of injection events having taken place, the formula will increment the injection event sequence number during each injection event. But, the injection event sequence number will never be incremented past 10. Instead, any incrementation that would cause the injection event sequence number to pass 10 will instead result in an injection event sequence number of 1. As a result, the injection event sequence number will repeatedly cycle from 1 to 10 as the count is incremented.

The selecting of one of the plurality of shot modes (step 130) may include accessing a lookup table such as, for example, Table 2, which may be stored in the memory of controller 22. Table 2 may be in the form of a table, graph, equation, or other memory structure capable of storing relational information. For example, Table 2 may relate the rank of the selected one of the plurality of shot modes, the shot mode pattern number, and the injection event sequence number. It is contemplated that these relations may vary depending on the makeup and use of combustion engine 12. It is also contemplated that these relations may correspond to all possible combinations of the determinations of steps 110 and 120. For example, Table 2, as depicted below, may include injection event sequence numbers 1 thru 10. Table 2 may also include the shot mode pattern numbers 1 thru 22 from Table 1, above.

TABLE 2

| Injection Event Sequence Number | Shot Mode Pattern Number | | | | | | | | | | | | | | | | | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 1 | i | ii | ii | ii | ii | ii | ii | i | i | i | i | ii | ii | ii | ii | ii | i | i | ii | ii | ii | i |
| 2 | i | i | i | i | i | i | i | i | i | i | i | i | i | i | i | i | i | iii | iii | iii | iii | iii |
| 3 | i | i | i | i | i | i | i | ii | ii | ii | ii | ii | ii | iii | iii | iii | ii | ii | i | i | i | ii |
| 4 | i | i | i | i | i | i | i | i | i | i | i | i | i | i | i | iii | iii | ii | iv | ii | i |
| 5 | i | i | i | i | ii | ii | iii | i | i | i | i | ii | ii | ii | ii | ii | i | i | iii | iii | iii | iv |

TABLE 2-continued

| Injection Event Sequence Number | Shot Mode Pattern Number | | | | | | | | | | | | | | | | | | | | | |
|---|---|---|---|---|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 | 18 | 19 | 20 | 21 | 22 |
| 6 | i | i | ii | iii | i | i | i | ii | ii | iii | iii | i | i | i | i | i | ii | ii | i | i | iv | ii |
| 7 | i | i | i | i | i | i | i | i | i | i | i | ii | ii | ii | ii | iii | ii | ii | i | i | i | i |
| 8 | i | i | i | i | i | i | i | i | i | i | i | i | i | i | i | i | iii | iv | iii | iii | iii | iii |
| 9 | i | i | i | i | ii | iii | iv | ii | ii | ii | ii | ii | iii | iii | iv | iv | i | i | ii | ii | ii | ii |
| 10 | i | i | i | i | i | i | i | ii | iii | iii | iv | i | i | i | i | i | ii | ii | i | i | i | iv |

Controller 22 may lookup the rank of the selected one of the plurality of shot modes, based on the shot mode pattern number and the injection event sequence number. For example, if the shot mode pattern number is 20 and the injection event sequence number is 8, the rank of the selected one of the plurality of shot modes may be iii. Controller 22 may then determine the selected one of the plurality of shot modes. Specifically, controller 22 may determine which one of the plurality of shot modes corresponds to the rank of the selected one of the plurality of shot modes. For example, if the rank of the selected one of the plurality of shot modes is iii, the selected one of the plurality of shot modes may be shot mode B.

Controller 22 may then operate fuel injector 14 to inject a quantity of fuel into a cylinder or combustion chamber of combustion engine 12 in accordance with the selected one of the plurality of shot modes (step 140). After step 140, controller 22 may continually repeat steps 100 thru 140. Values before each repetition takes place are hereafter referred to as "old." Values determined while each repetition takes place are hereafter referred to as "new." The continual repetition is hereafter referred to as "continuous transitioning" because multiple transitions between two or more of a plurality of shot modes may take place over the course of only a few of the repetitions. During each repetition of steps 100 thru 140, it is contemplated that the injection event sequence number may be increased by one unless this increase would cause the new injection event sequence number to be 11. If the increase would cause the new injection event sequence number to be 11, the new injection event sequence number may be set to 1. During each repetition of steps 100 thru 140, it is also contemplated that a new shot mode pattern number may be determined. This determination of the new shot mode pattern number may be without regard to an old shot mode pattern number.

Unless either the new speed of combustion engine 12 is different from the old speed of combustion engine 12 or the new desired supplied fuel quantity is different from the old desired supplied fuel quantity, the new shot mode pattern number may be the same as the old shot mode pattern number. During subsequent repetitions of steps 100 thru 140, it is contemplated that the new injection event sequence number may repeatedly cycle through the numbers 1 thru 10. Additionally, it is contemplated that the new shot mode pattern number may not change unless either the new speed of combustion engine 12 becomes different from the old speed of combustion engine 12 or the new desired supplied fuel quantity becomes different from the old desired supplied fuel quantity. This combination of the cycled new injection event sequence number and the unchanged new shot mode pattern number may cause controller 22 to consistently select one of the plurality of shot modes within a single column of Table 2. Over time, this may result in the plurality of shot modes within the single column of Table 2 being weighted such that combustion engine 12 operates on average within close proximity to the new desired supplied fuel quantity and/or the new desired speed of combustion engine 12.

If either the new speed of combustion engine 12 is different from the old speed of combustion engine 12 or the new desired supplied fuel quantity is different from the old desired supplied fuel quantity, the new shot mode pattern number may be different from the old shot mode pattern number. It is contemplated that a substantial change in either the speed of combustion engine 12 or the desired supplied fuel quantity may yield a substantial change in the shot mode pattern number. This may cause controller 22 to select one of the plurality of shot modes from a new column of Table 2. This new column of Table 2 may be located horizontally far from the old column of Table 2. Thus, it is contemplated that combustion engine 12 may quickly respond to the new desired supplied fuel quantity and/or the new desired speed of combustion engine 12.

Conversely, an insubstantial change in either the speed of combustion engine 12 or the desired supplied fuel quantity may yield an insubstantial change in the shot mode pattern number. This may cause controller 22 to select one of the plurality of shot modes from a new column of Table 2. This new column of Table 2 may be located horizontally close to the old column of Table 2. Thus, it is contemplated that the operation of combustion engine 12 may change slightly in response to the new desired supplied fuel quantity and/or the new desired speed of combustion engine 12. It is further contemplated that this slight change may increase an efficiency of combustion engine 12 by smoothing a power curve of combustion engine 12. This is because the slight change may result in the plurality of shot modes within the new column of Table 2 being weighted such that combustion engine 12 operates on average within close proximity to the new desired supplied fuel quantity and/or the new desired speed of combustion engine 12.

It will be apparent to those skilled in the art that various modifications and variations can be made to the method and system of the present disclosure. Other embodiments of the method and system will be apparent to those skilled in the art from consideration of the specification and practice of the method and system disclosed herein. It is intended that the specification and examples be considered as exemplary only, with a true scope of the disclosure being indicated by the following claims and their equivalents.

What is claimed is:

1. A method of operating a fuel injection system, comprising:
    receiving a first signal indicative of a count;
    determining an injection event sequence number based on the first signal;
    receiving a second signal indicative of a speed of a combustion engine;

receiving a third signal indicative of a desired supplied fuel quantity; and determining a shot mode pattern number, based on the second signal and the third signal;

selecting one of the plurality of shot modes based on the injection event sequence number and the shot mode pattern number;

operating a fuel injector of the fuel injection system in the selected one of the plurality of shot modes.

2. The method of claim 1, wherein each one of the plurality of shot modes includes a different set of fuel delivery characteristics.

3. The method of claim 1, wherein determining the shot mode pattern number includes:

calculating a relative weighting of each of the plurality of shot modes, based on the second signal and the third signal; and rounding the relative weighting of each of the plurality of shot modes, wherein determining the shot mode pattern number is based on the rounded relative weighting of each of the plurality of shot modes.

4. The method of claim 3, wherein:

the plurality of shot modes includes a first shot mode, a second shot mode, a third shot mode, and a fourth shot mode;

the first shot mode and the second shot mode are equivalent shot modes included by a first combined shot mode;

the third shot mode and the fourth shot mode are equivalent shot modes included by a second combined shot mode; and determining the shot mode pattern number further includes:

summing the relative weighting of the first shot mode and the relative weighting of the second shot mode; and summing the relative weighting of the third shot mode and the relative weighting of the fourth shot mode, wherein determining the shot mode pattern number is based on the summed relative weightings.

5. The method of claim 1, wherein determining the shot mode pattern number includes accessing a lookup table.

6. The method of claim 1, wherein determining the injection event sequence number includes performing a modulo operation, the modulo operation including the count.

7. A machine, comprising a combustion engine including a combustion chamber;

a first sensor disposed to sense a parameter indicative of a speed of the combustion engine and generate a corresponding first signal;

a second sensor disposed to sense a parameter indicative of a desired supplied fuel quantity and generate a corresponding second signal;

a counter, wherein the counter determines a parameter indicative of a count and generates a corresponding third signal; and a fuel injection system, including:

a controller in communication with the first sensor, the second sensor, and the counter, wherein the controller comprises memory storing instructions, wherein the instructions include determining a relative weighting of each of a plurality of shot modes based on the first signal and the second signal, selecting one of a plurality of shot modes based on the relative weighting, the first signal, the second signal, and the third signal, generating a corresponding fourth signal; and a fuel injector in communication with the controller, wherein the fuel injector inject a quantity of fuel into the combustion chamber based on the fourth signal.

8. The machine of claim 7, wherein selecting one of the plurality of shot modes includes determining a shot mode pattern number, based on the first and second signals.

9. The machine of claim 7, wherein determining the relative weighting of each of the plurality of shot modes includes:

calculating the relative weighting of each of the plurality of shot modes, based on the first and second signals; and rounding the relative weighting of each of the plurality of shot modes.

10. The machine of claim 8, wherein determining the shot mode pattern number includes accessing a lookup table.

11. The machine of claim 7, wherein selecting one of the plurality of shot modes includes determining an injection event sequence number, based on the third signal.

12. The machine of claim 11, wherein determining the injection event sequence number includes performing a modulo operation, the modulo operation being based on the third signal.

13. The machine of claim 7, wherein selecting one of the plurality of shot modes includes accessing a lookup table.

14. A method of operating a fuel injection system, comprising:

receiving a first signal indicative of a first count;

determining an injection event sequence number based on the first signal;

receiving a second signal indicative of a first speed of a combustion engine;

receiving a third signal indicative of a first desired supplied fuel quantity;

selecting a first one of a plurality of shot modes based on the injection event sequence number, the second signal, and the third signal;

injecting with a first fuel injector of the fuel injection system a first quantity of fuel, based on the selected first one of the plurality of shot modes;

receiving a fourth signal indicative of a second count;

determining a second injection event sequence number based on the fourth signal;

receiving a fifth signal indicative of a second speed of the combustion engine;

receiving a sixth signal indicative of a second desired supplied fuel quantity;

selecting a second one of the plurality of shot modes based on the second injection event sequence number, the fifth signal, and the sixth signal; and injecting with a second fuel injector of the fuel injection system a second quantity of fuel, based on the selected second one of the plurality of shot modes.

* * * * *